US009563720B2

(12) United States Patent
Carbonell et al.

(10) Patent No.: US 9,563,720 B2
(45) Date of Patent: *Feb. 7, 2017

(54) MATCHING USERS OF A NETWORK BASED ON PROFILE DATA

(71) Applicant: WeSpeke, Inc., Pittsburgh, PA (US)

(72) Inventors: Jaime G. Carbonell, Pittsburgh, PA (US); Michael E. Elchik, Moon Township, PA (US); Jason Simmons, Pittsburgh, PA (US); Adel Assaad, Pittsburgh, PA (US); Robert J. Pawlowski, Jr., Cranberry Township, PA (US)

(73) Assignee: WESPEKE, INC., Pittsburgh, PA (US)

( * ) Notice: Subject to any disclaimer, the term of this patent is extended or adjusted under 35 U.S.C. 154(b) by 153 days.

This patent is subject to a terminal disclaimer.

(21) Appl. No.: 14/173,260

(22) Filed: Feb. 5, 2014

(65) Prior Publication Data

US 2014/0222806 A1  Aug. 7, 2014

Related U.S. Application Data

(60) Provisional application No. 61/761,267, filed on Feb. 6, 2013.

(51) Int. Cl.
*G06F 7/00* (2006.01)
*G06F 17/30* (2006.01)
*G06Q 30/02* (2012.01)

(52) U.S. Cl.
CPC ... *G06F 17/30979* (2013.01); *G06F 17/30029* (2013.01); *G06F 17/30867* (2013.01); *G06Q 30/02* (2013.01)

(58) Field of Classification Search
None
See application file for complete search history.

(56) References Cited

U.S. PATENT DOCUMENTS 6,341,267 B1   1/2002  Taub
7,454,357 B2 * 11/2008  Buckwalter ............ G06Q 30/02
                                                     705/346

(Continued)

OTHER PUBLICATIONS

Horowitz et al., "The Anatomy of a Large-Scale Social Search Engine", Proceedings of the 19th International Conference on World Wide Web, WWW '10, Apr. 26, 2010, p. 431-440.

*Primary Examiner* — Uyen Le
(74) *Attorney, Agent, or Firm* — Fox Rothschild LLP (57) ABSTRACT

A method and system for matching users of a network, such as a language learning network, employs user profile data to determine point match scores and/or compatibility match scores between users of the network such as a social network. A point match score is a measure of strength for a single interest that two users share. A compatibility match score is an aggregate measure of similarity of multiple interests that two users share. When a first user asks the system to propose another user or users for interaction, the system uses the point match scores, compatibility match scores, or both to determine which additional users to recommend to the first user. The system may present the first user with a profile for each recommended user. The first user may select one of the recommended users and engage in interaction, such as language skills learning or practice, with that user via a text, audio and/or video interface.

23 Claims, 5 Drawing Sheets (56) References Cited

U.S. PATENT DOCUMENTS

| | | |
|---|---|---|
| 7,739,231 B2 | 6/2010 | Flinn et al. |
| 7,911,335 B1 | 3/2011 | Brady, Jr. |
| 8,060,573 B2 | 11/2011 | Leonard |
| 8,180,804 B1 | 5/2012 | Narayanan et al. |
| 8,185,558 B1 | 5/2012 | Narayanan et al. |
| 8,195,673 B2 | 6/2012 | Wilf |
| 9,177,064 B2 * | 11/2015 | Elchik ............... G06F 17/30669 |
| 2001/0020253 A1 | 9/2001 | Arao |
| 2003/0186208 A1 | 10/2003 | Wen et al. |
| 2008/0097822 A1 * | 4/2008 | Schigel ............... G06Q 10/063 705/7.33 |
| 2008/0222308 A1 | 9/2008 | Abhyanker |
| 2008/0254431 A1 | 10/2008 | Woolf et al. |
| 2009/0144808 A1 | 6/2009 | Dhananjaya |
| 2009/0217196 A1 | 8/2009 | Neff et al. |
| 2009/0317776 A1 | 12/2009 | Keim et al. |
| 2010/0120011 A1 * | 5/2010 | O'Brien ............... G06Q 10/10 434/362 |
| 2011/0302209 A1 | 12/2011 | Flinn et al. |
| 2012/0066231 A1 | 3/2012 | Petersen et al. |
| 2012/0089635 A1 | 4/2012 | Elchik |
| 2012/0272160 A1 | 10/2012 | Spivack et al. |
| 2012/0278166 A1 | 11/2012 | Badros et al. |
| 2012/0290978 A1 * | 11/2012 | Devecka ............... H04W 4/206 715/810 |
| 2013/0007013 A1 | 1/2013 | Geisner et al. |
| 2013/0080428 A1 * | 3/2013 | Wang ............... G06Q 10/10 707/732 |
| 2013/0179438 A1 | 7/2013 | Coldicott et al. |
| 2013/0282605 A1 * | 10/2013 | Noelting ............... G06Q 10/1053 705/321 |
| 2014/0025733 A1 * | 1/2014 | Khan ............... G06Q 30/02 709/204 |
| 2014/0101146 A1 * | 4/2014 | Scriffignano ........ G06F 17/3053 707/728 |
| 2014/0143250 A1 * | 5/2014 | Martin ............... G06F 17/30598 707/737 |
| 2014/0156652 A1 * | 6/2014 | Abiola ............... G06F 17/3053 707/723 |

* cited by examiner

MATCHING USERS OF A NETWORK BASED ON PROFILE DATA

BACKGROUND

This patent document claims priority to U.S. Provisional Patent Application No. 61/761,267, titled "Matching Users of a Network Based on Profile Data," filed Feb. 6, 2013, the disclosure of which is fully incorporated into this document by reference.

BACKGROUND

This document relates to online networks, such as online educational networks, learning systems, social networks and other systems where multiple users may interact with each other via text and/or video through a communications network such as the Internet. In such systems, it may be easy and common for individuals who already know each other (e.g., "friends") to connect and interact. However, social network systems may encounter difficulty connecting compatible users who may not know each other. If social network systems match users who are not compatible or who do not share common interests, or fails to match those with common interests, user interaction may be hindered and in particular educational social networks may not prove effective.

This document describes new systems and methods that provide solutions to some or all of the problems described above via matching users based on common interests primarily for the purpose of language instruction. In addition, the matching processes described in this document may provide additional benefits.

SUMMARY

A method and system for matching users of a network employs user profile data to determine point match scores and/or compatibility match scores between users of the network. A point match score is a measure of strength for a single interest that two users share. A compatibility match score is an aggregate measure of similarity of multiple interests that two users share. The match may be between two users of the network, between groups of users of the network, or between one central user (e.g., a teacher) and multiple other users (e.g., students). When a first user asks the system to propose another user for interaction, the system uses the point match scores, compatibility match scores, or both to determine which additional users to recommend to the first user. The system may present the first user with a profile for each recommended user. The first user may select one of the recommended users and engage in interaction, such as language skills learning or practice, with that user via text, audio and/or video.

For example, in one embodiment, the system may maintain a database of profile data for users of the network. The profile data for each user will include at least one attribute and at least one interest. When the system receives a request for interaction from a first user of the network, its processor may execute programming instructions that cause it to select one or more other users to present to the first user as candidates for interaction. To do this, the system may select a subset of the users as a candidate set. The candidate set may include users whose attributes indicate a target language and goal that correspond with those of the first user's request. The system may determine a point match score for each user in the candidate set, wherein the point match score represents a measure of strength for a single interest that the candidate set user shares in common with the first user. The system may also determine a compatibility match score for each user in the candidate set, wherein the compatibility match score represents a collective measurement for a multiple of interests that the candidate set user shares in common with the first user. The system may use the point match scores, the compatibility match scores or both to select a user from the candidate set as a second user who is a candidate for interaction with the first user via the network, and it may present a profile of the second user to the first user.

Optionally, the system may present a first interface for the first user and a second interface for the second user so that the first user and the second user may interact with each other via the first and second interfaces. Examples of such interfaces include video interfaces.

Optionally, when presenting the profile, the system may present a description of one or more of the interests that the second user shares in common with the first user, and/or a representation of the measure of strength for the single interest, a representation of the collective measurement, or both.

Before determining the point match score, the system may measure a number of representations of interests of first user using a reciprocal-weighted preference accumulation, and it may expressing any measured interest that is below a threshold as zero. In some embodiments, the system may use the point match scores to select additional users from the candidate set as additional candidates for interaction with the first user via the network, wherein each of the additional users corresponds to a point match score that exceeds a threshold, and it may present profiles for the additional users to the first user. In addition or alternatively, the system may use the compatibility match scores to select a additional users from the candidate set as additional candidates for interaction with the first user via the network, wherein each of the additional users corresponds to a compatibility match score that exceeds a threshold, and it may present profiles for those additional users to the first user.

Optionally, when selecting a user from the candidate set as the second user, the system may determine, for each user in the candidate set, a product of that user's point score and compatibility match score; and it may select the second user to be the user in the candidate set who corresponds to the highest determined product. If the request for interaction may include a discussion topic, then when selecting the second user the system identify the user from the candidate set who corresponds to the highest point match score for an interest that corresponds to the discussion topic. Optionally, the system may exclude from selection as the second user any user in the candidate set who corresponds to an exclusion criterion. Optionally, the system may require that the second user meet one or more availability criteria, such as whether the user is online now, whether the user is a current subscriber, or whether the user has remaining service credit available.

In some embodiments, the system may receive from the first user a goal for interaction with another user via the network, and when selecting the candidate set it may include only those users having one or more attributes that are compatible with the goal. In addition, the system may receive a language request from the first user, and if so then when selecting the candidate set the system may including in the candidate set only those users having language attributes that correspond to the language request.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms of any noun, along with the modifiers "a," "an," and "the," include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

An "electronic device" refers to a device that includes a processor and tangible, computer-readable memory. The device may include, or it may be connected to, a display that outputs video. The memory may contain programming instructions in the form of a software application that, when executed by the processor, causes the device to perform one or more operations according to the programming instructions. Examples of electronic devices include personal computers, laptops, tablets, smartphones, media players and the like.

A "network" or "social network" refers to a system whereby two or more users may interact with each other via text, audio and/or video through a communications network such as the Internet. The users may interact with friends and existing contacts, or they may discover and interact with new contacts through the social network. An example of a social network for online learning is disclosed in United States Patent Application Pub. No. 2012/0089635, titled "Language Learning Exchange," filed Oct. 12, 2011 by Elchik, the disclosure of which is fully incorporated by reference in this document.

Figure 1:
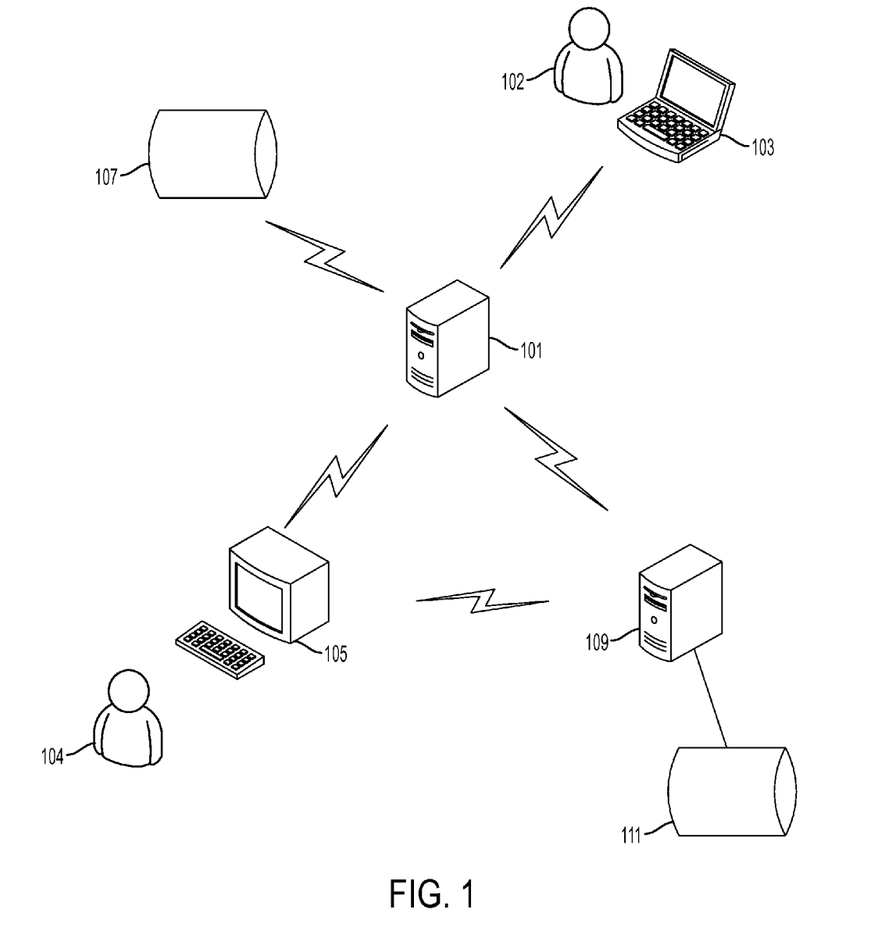
FIG. 1 illustrates various elements of an example of a social network.

FIG. 1 illustrates an example of various components of a social network, in this example a language learning exchange and its users. A processing system 101 serves as a communications hub for users 102, 104 of the social network. The processing system may serve one or more web pages or other interfaces for user electronic devices 103, 105, or it may receive and direct communication streams to and from the devices based on operations of one or more software applications installed on each device. The web pages or other interfaces will contain functions that enable the users to interact with each other by video and/or other communications mechanisms.

The processing system 101 will have access to a dynamically-updatable user profile database 107 that contains profile data about registered users of the social network. The system may obtain a user's profile data from the user himself or herself, it may collect profile data based on actions that the user takes when using the social network, and/or it may collect profile data from one or more external systems 109 such as web pages, stored data or other social networks that also have access to profile data 111 for the user, such as another social network.

Figure 2:
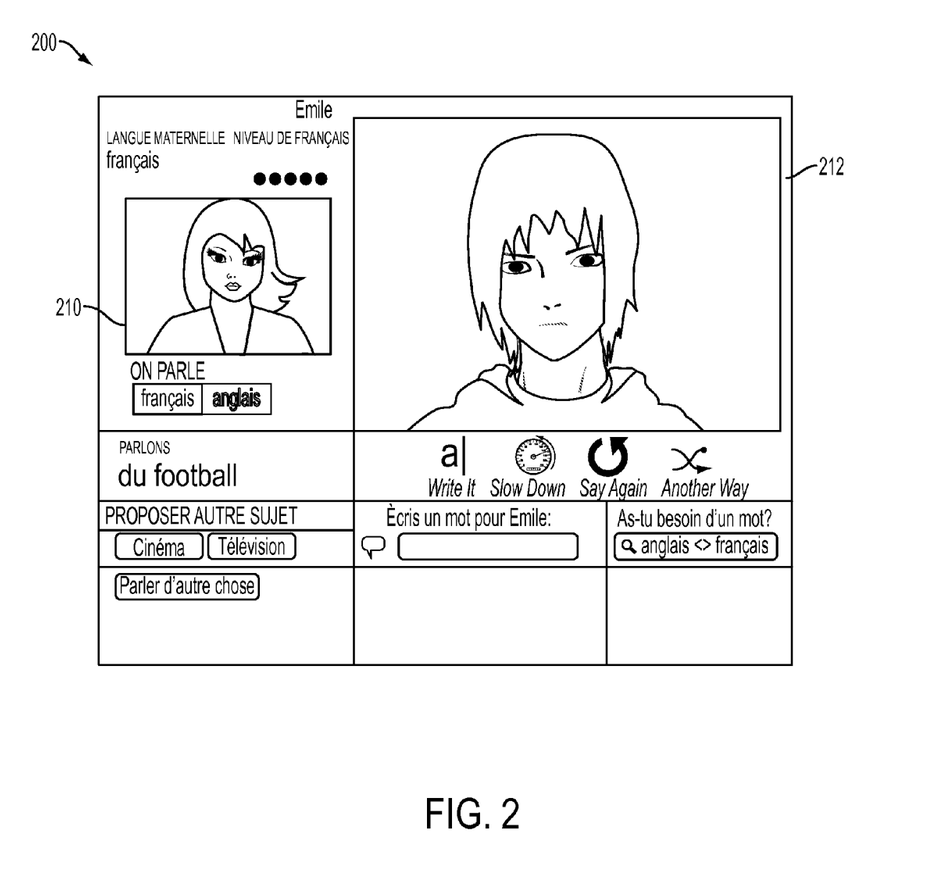
FIG. 2 illustrates an example of a user interface that a social network may provide.

In a social network that is a language learning system, users may teach, learn and practice languages via an interactive, online user interface where at least two individuals may speak with each other via a live text, video and/or audio conference. The system may offer and recommend other users as conversation partners for a user based on matching processes described below, as well as additional criteria such as choice of language and language abilities. FIG. 2 illustrates an example of a user interface 200 of a language learning system. The user interface may include text, video and/or audio interfaces through which a pair of users may see and communicate with each other. As shown, an interface for a first user may include a first interface 210 that displays a text, audio and/or video feed for the first user. It also may include a second interface 212 that displays a text, audio and/or video feed of the second user with whom the first user is interacting. The users may then engage in a dialogue via the text/audio/video interfaces. Such interfaces may be implemented to run on a web browser, a software application such as a mobile app, or another mechanism.

Returning to FIG. 1, the user profile database 107 will contain profile data corresponding to users of the network. The profile data will include attributes and interests for each user. "Attributes" are characteristics or capabilities of the user. Examples of attributes may include age, gender, geographic location, educational level, job, school affiliation, organizations of which the user is a member, native language, and level of proficiency in one or more non-native languages. "Interests" are characteristics that describe the user's preferences or interests in one or more areas, activities, entertainment options, hobbies, and the like. Examples of interests at different levels of granularity may include sports, cooking, bluegrass music, reading mystery novels, and the like. In some embodiments, interests may be characterized as either positive interests or negative interests. For example, if the user likes sports but not golf, "sports" may be a positive interest and "golf" may be a negative interest. In some embodiment, interests may be associated with an interest level, such as a numeric or graded rating that represents the strength or weakness of the user's interest in a particular topic.

Figure 3:
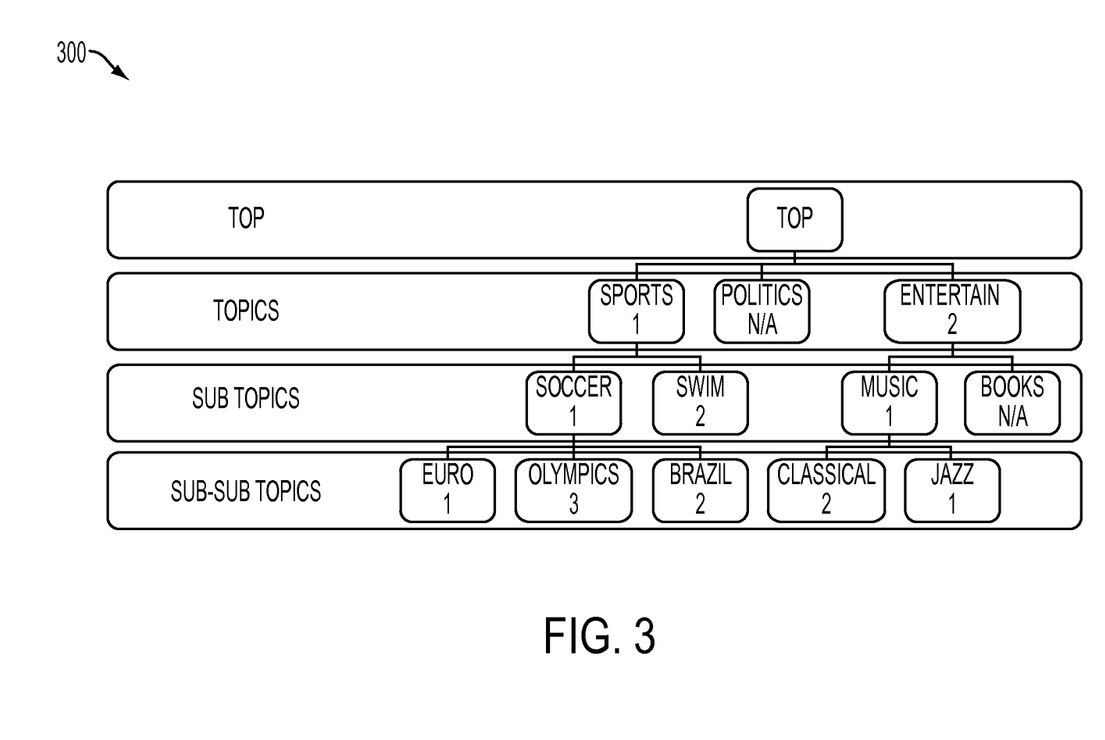
FIG. 3 illustrates measurement levels of various interests that a social network user exhibits, as represented in a tree structure.

In some embodiment, interests may be categorized into one or more topics and sub-topics, and sub-sub topics, etc., with each topic and/or sub-topic organized such as in a hierarchical data structure. For example, FIG. 3 shows a partial set of profile data 300 with topics and subtopics for various user interests. The data includes a measure of the level of the user's interest in each topic and sub-topic shown, with "3" representing the highest level of interest. In the example of FIG. 3, the profile data 300 shows that the user has a fairly low interest in the general topic of sports, but that the user is quite interested in the Olympics. The user has a moderate interest for entertainment, and when one drills down within that general topic the data shows that the user has a low interest in music but does exhibit a preference for classical music over jazz. The interest level of "N/A" for politics and books shows that the data is insufficient to assess the user's interest in those topics. Alternatively, "N/A" could represent no interest, or the system could assign a numeric value of low interest to that topic.

Figure 4:
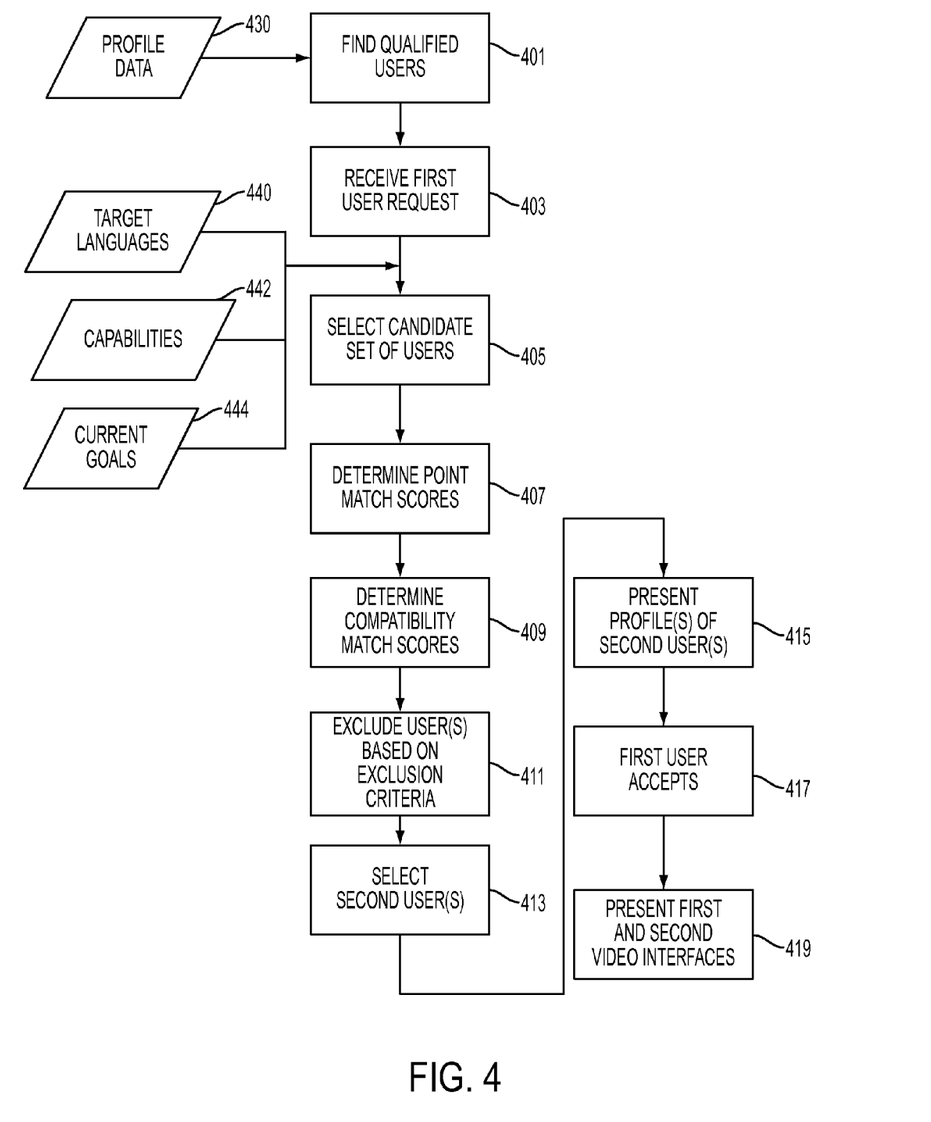
FIG. 4 illustrates an example of a user-to-user matching process.

FIG. 4 is a flow diagram illustrating various elements of a matching process that a matching system of a social network may use. The system may collect and store in the database profile data 430 for various users who are members of or otherwise known to be users of the social network. Assimilation of user profile data into the system can be accomplished in any suitable way, such as by receiving user responses to an on-line form, all at once, incrementally over time, by receiving user responses to questions posed by the system at opportune moments, such as when the user wants to find better matches or his/her interests change, by extracting the information from structured or semi-structured existing sources such as another social network, by inferring interests indirectly from user actions (such as visiting sites on professional soccer) or by other methods. As noted above, the profile data may include one or more attributes and one or more interests for each user.

Optionally, the system may ask users may to provide level of interest data in a hierarchical manner, scoring or ranking the topics, such as by ranking the topics from the most interesting to the least interesting (at least, for the topics for which the user has expressed preference). This may generate a topic/interest preference tree, as illustrated by the following example of an interaction: "Please rank the following topics based on your interest: a) politics, b) sports, c) travel, d) fashion, e) entertainment, f) technology, g) health." Some topics may be presented based on one or more user attributes. For example, if the person's profile data indicates that the person is single, then other categories associated with "single" status (such as "dating") may appear. If the person is married with children, then associated categories such as "family" or "schools" or "children" may appear. If the person's age is greater than 55, then "retirement" may appear as a topic. If the user ranks the interests as sports first, travel second, dating third, and expresses no other interests, then the system may assign a corresponding weight to each interest, such as: sports 1, travel ½, dating ⅓, all others 1/n (where n=number of categories at this level). The method of selectively eliciting interests by inference from other attributes and of deriving approximate scores from ranking the interest may be part of the system and method described in this document.

Then, for the selected categories the system may ask the user to provide preference information about sub-topics. For example, under the topic of "sports," the system may ask the user to score or rank his or her interests in: a) soccer, b) basketball, c) baseball, d) ice hockey, e) swimming, and/or f) other sports. If the user ranks soccer first, swimming second, and boxing third, then the system may drill down more into subtopics of among the higher interest topics. For example, since soccer was the highest interest at the sub-topic level, the system may ask the user to score or rank sub-sub-topics, such as the World Cup, European league, United States soccer, and others. Optionally, at any point the user may enter a command that causes the system stop the ranking process or pause the ranking process until the user returns later to express more interests. In each case of this example, the ranked weight may be 1/rank for all when a preference is expressed and 1/n (n=total number of elements in list) for all others.

Optionally, the system may convert the profile data into a vector-style representation, where each element of the vector represents by position the interest area, and by magnitude the degree to which a user is interested in this area. For instance a vector could represent interests in [sports, soccer, European league, golf, cooking, fashion, music, classical-music, rock], and a specific user's profile could be: [1, 2, 5, −2, 0, 0, 1, 0, 3], meaning that the user is generally interested in sports (1), especially soccer (2) and most of all the European soccer league (5), but finds golf boring (−2), has no opinion regarding cooking (0) or fashion (0), is generally interested in music (1), though not classical (0) but definitely rock (3). Alternate encodings of this information into data structures such as trees or records or tables are also possible. FIG. 3 illustrates such a tree structure.

Optionally, the tree structure may be converted to a vector representation. For example, a representation of the measures of user interest in FIG. 3 may be converted as:

| European soccer | Olympic soccer | Brazilian soccer | Politics - US | Politics - Europe | Classical music | Jazz music | Books - literature | Books - reference |
|---|---|---|---|---|---|---|---|---|
| 1.000 | 0.333 | 0.500 | 0.000 | 0.000 | 0.250 | 0.500 | 0.005 | 0.005 |

In this process, the system may obtain the numbers by a reciprocal-weighted preference accumulation, such as:

$$\text{Weight}(P) = \prod_{i \in levels} (1/r_i)$$

For example, a measure of a user's preference for classical music may be determined as ½×1×½=0.250, because it is the second preference at the first level, the first preference at the second level and again the second preference at the third level. When no preference is expressed r may equal the number of available choices. For example, if there were 10 choices at each level, the system may determine a measure of interest for literature books ½×⅒×⅒=0.005. The system may apply one or more thresholds, such as by considering anything below 0.003 (or another value) as too low and thus simply expressed as zero. In the example above, this results in zeroes for politics.

Optionally, the system may periodically update the profile data. Alternatively, it may weight any or all of the profile data so that recently-received data or recently-updated data is given more weight than older data. Optionally, interest data that is more than a threshold period of time old may be given no weight and/or discarded.

Returning to FIG. 4, the system may identify a group of qualified users 401 that meet one or more availability criteria that make them candidates for matching with other users. Availability criteria for classifying a user as a qualified user may include factors such as whether the user is online now, whether the user is a current subscriber to a particular service or level of service, whether the user has any remaining service credit available at the time of interest, or other factors relating to whether or not the user is qualified to interact with other users of the system.

When the system receives a request for matching 403 from a first one of the qualified users, it may select a subset of the qualified users as a candidate set for matching 405. The request for matching may include one or more goals, such as target languages 440 that the first user desires to practice during interaction with another user, one or more capabilities 442 (e.g., skill levels of first user in the target language), or other goals 444 such as casual, business or reading; a preferred gender of the second user; or a preferred time or times for the interaction.

When selecting the candidate set 405, the system may select a subset of users having attributes that correspond to the first user's goals. This may be done by any suitable selection method, such as by finding exact matches, matches within a certain range, minimum matching criteria, or other methods. For example, if the first user's native language is English, the first user's goal is to speak French, and the first user has a moderate capability level of speaking French, then the candidate set of users may be those users whose native language is French or are fluent in French, and who have a moderate or better capability level of speaking English. This candidate set may restrict the search set of user profiles prior to running an in-depth matching algorithm. In a language learning system, this goal-based restriction may limit the candidates for matching to user profiles that match language learning objectives.

The system will then use profile data to select 413 and propose one or more people in the candidate set as candidates for interaction with the first user. (For ease of reference, this document may refer to such users as a "second user" or an "additional user.") Optionally, the system may inform both the initial user and the second user the reasons for the selection for matching the two users, such as by listing the primary common interest(s).

Optionally, the system may determine a number of people to propose to the first user, and the number may be set by policy or determined by any suitable criteria. For instance, the system may select different sizes of output sets (e.g. by default "1" or "3", but if there are many good matches or the service level of the user is high, then "10") based on ranking or on absolute match score cutoff. Optionally, the system may include in the set of proposed second users any people with whom the first user recently interacted, such as people whom the user contacted within the past ten days or another time period. If so, optionally the system may require that such recent contacts be compatible with the first user's goals in order to be included in the proposed set of second users.

To select the set of proposed second users, the system will determine point match scores 407 and/or compatibility match scores 409 for each user in the candidate set. A point match score is a measure of strength for a single interest that the person shares in common with the first user. A compatibility match score is an aggregate measure of similarity of multiple interests that the person shares in common with the first user, possibly overweighted with the strongest single match criterion as the topic of first conversation. Such scores may be determined in multiple ways. Example methods of calculating point match scores and compatibility match scores will be described in more detail below.

The match scores may be determined in various ways. One method is to use the fixed pre-order compiled preference vector of each user. This may be the vector dot product or cosine similarity or any other vector similarity function, and the system may return the top k matches, wherein k=the number of possible second users that the system desires to propose to the first user. In the example computations below, the process designates the invoking user as U-inv, and his or her vector of interests, and each user in the data base as U-j (excluding the invoking user) with the associated interest vector. We now write the matching criterion as:

$$\text{Matches}(\vec{u}_{inv}) = \text{Argmax}_{j \in Users \setminus (inv \cup prev)}^{k}(\vec{u}_j \cdot \vec{u}_{inv})$$

The example calculation above excludes previously shown matches "prev" to U-inv. This exclusion is optional and may be skipped, for example to remind the user of past matches. The back-slash denotes set-difference (exclusion).

For clarity, we expand the dot product below, which leaves a pure scalar computation:

$$\text{Matches}(\vec{u}_{inv}) = \text{Argmax}_{j \in Users \setminus \{inv\} \cup prev\}}^{k}\left(\sum_{i=1,|u|} u_{i,j} u_{i,inv}\right)$$

The example above shows how a compatibility match score may be determined, as it aggregates (in this case sums) the measures of a number of interests. For a point score, the equation above may be modified by replacing the sum function ($\Sigma_\downarrow$) with $U_{max}$, where $U_{max}$ represents the highest matching point score.

Alternately both methods may be combined in a mixture model as follows, where alpha ($\alpha$) is the mixture weight balancing the maximum shared interest with the aggregate shared interests, and where the range of j is the same as above, but omitted for clarity:

$$\text{Matches}((\vec{u}_{inv}) = \text{Argmax}_j^k\left(a \sum_{i=1,|u|} u_{i,j} u_{i,inv} + (1-\alpha) \text{Max}_{i=1,|u|}(u_{i,j} u_{i,inv})\right)$$

The time complexity of the matching algorithm in terms of vector multiplications is the number of non-excluded users. For example, the system may first require that the user be qualified or have attributes that are compatible with the first user's goals such as language skills Hence the vectorized hierarchical interests profile may have an embodiment which permits very fast matching despite large numbers (e.g., up to and including millions) of potential users in the social network.

Optionally, the system may determine matches dynamically. Alternatively, or in addition, for speed of execution it may store a pool of k-matches sorted by score, and it may compare every new match to the score of the lowest-score element for admission to the pool. If the new match is admitted, the system may drop the lowest-score element to keep the pool at its set size, and it may insert the new match so as to keep the pool sorted. Heuristic or other filtering may be applied to the pool admission logic. This single-threaded kernel may compatible with a map-reduce approach where the map-step splits the search space into equal subsets, and the reduce-step populates the match pools with the top performers of their respective subsets. The individual pools may be merged into a single pool of a desired size.

Optionally, the system may determine one or more reasons for a number of top matches by re-performing the matching process for the top matches with a component-trace process activated to identify and store the contributions of the largest interest factors. Thus, for example, the system can inform the first user that it matched the first user to "user X" because user X can teach French and Portuguese, and both the first user and user X like Brazilian Soccer and Jazz music.

Alternatively, the system may keep the dot product components for every match as long as it is a member of a match pool (discarding them only when the match is dropped due to a low score). As an additional step the system may analyze the top contributing dot product components to inform the user about the rationale for the match.

Optionally, the system may introduce one or more coefficients to alter the weighting of the individual dot product components (that is the attributes or preferences of each user) based on pre-determined criteria, based on user-stated ranking or based on analyzing the feedback from the user (either direct or indirect feedback). Thus the equation above could be recast as:

$$\text{Matches}(\vec{u}_{inv}) = \text{Argmax}_{j \in Users \setminus \{inv\} \cup prev\}}^{k} \left( \sum_{i=1, |u|} u_{i,j} \alpha_{ii,inv} u_{i,inv} \right)$$

where $a_{ii}$ is a user-specific, per-component search coefficient (in a diagonal matrix of search coefficients) used to alter the weighting of the dot product components. This same weighted version could be extended to the mixture model of aggregate and maximum interest described previously.

Initially, the search coefficient matrix may be a unit matrix or may be initialized any other way, including from previous information about the users Subsequently, its value may change based on analyzing the events such as: (i) the first user selects the match at position j from the match set to view (reward curiosity); (ii) the first user requests an interaction with another user, with a monotonic effect on the search coefficients (reward engagement); or (iii) the user provides a positive rating to an interaction (reward success). Sustained success and/or repeated engagement with a partner may result in additional weighting (i.e., significance). Alternatively, one may scale each user's preferences vector by their corresponding search coefficient matrix before computing the dot product.

After the system determines point match scores 407 and compatibility match scores 409, the system may use those scores to select a set of possible second users 413. Examples of how the system may use point match scores and/or compatibility match scores to select possible second users 413 include:

Example 1

The system may select those people in the candidate set whose point match scores exceed a threshold, which may be predetermined, or which may be dynamically calculated based on criteria such as the current scores properties of the user, the number of users or any other criteria that may change over time. For instance, the threshold may be a fixed threshold, a percentage of a highest available point match score, a set of N people in the candidate set having the N highest point match scores in the set, a combination of any of these thresholds, and/or other thresholds.

Example 2

The system may select those people in the candidate set whose compatibility match scores exceed a threshold. The threshold may be a fixed threshold, a percentage of a highest available compatibility match score, a set of N people in the candidate set having the N highest compatibility match scores in the set, a combination of any of these thresholds, and/or other thresholds.

Example 3

The system may select those people in the candidate set whose point match scores for a specific topic of interest exceed a threshold. The threshold may be globally fixed or dynamically selected as a function of number of users, attributes of the user, and/or other criteria that may change over time. The topic of interest may correspond to an interest that the first user has selected as a discussion topic. The topic may be an exact match, or the topics may match based on a higher level category of the interest. For example, the first user may select "blues music" as the discussion topic, but the point match may correspond to the higher level category of "American music."

Example 4

The system may determine, for each person in the candidate set, a product of that user's point score and compatibility match score. The system may select as the user the person (or people) in the candidate set whose product corresponds to the highest determined product.

The system will present 415 the first user with profile data for the proposed second user(s). Optionally, when presenting the profile data, the system also may present a description of one or more interests that the second user shares in common with the first user. Optionally, this description may include a representation of a measure of strength of a point match, a representation a collective measurement of a compatibility match, or other details. The second user may indicate acceptance 417 of one of the second users, in which case the system will present first and second interfaces 419 to the users so that they may interact with each other via audio and/or video.

Optionally, at any point in the process, the system may exclude from the presented set of profiles any users whose profile data or other data satisfies one or more exclusion criteria 411. Exclusion criteria may include any rules that are set within the system for excluding a person from being presented as a second user candidate. Examples of exclusion criteria may include whether the system previously (or within a certain prior time period) proposed that person to the first user but the first user did not accept that person, or the match being too similar to another person that the user previously decided was not compatible Although FIG. 4 shows the exclusion process 411 occurring just before the system selects the proposed group of second users 413, the exclusion process may occur at other points in the process instead or in addition to the point shown.

Figure 5:
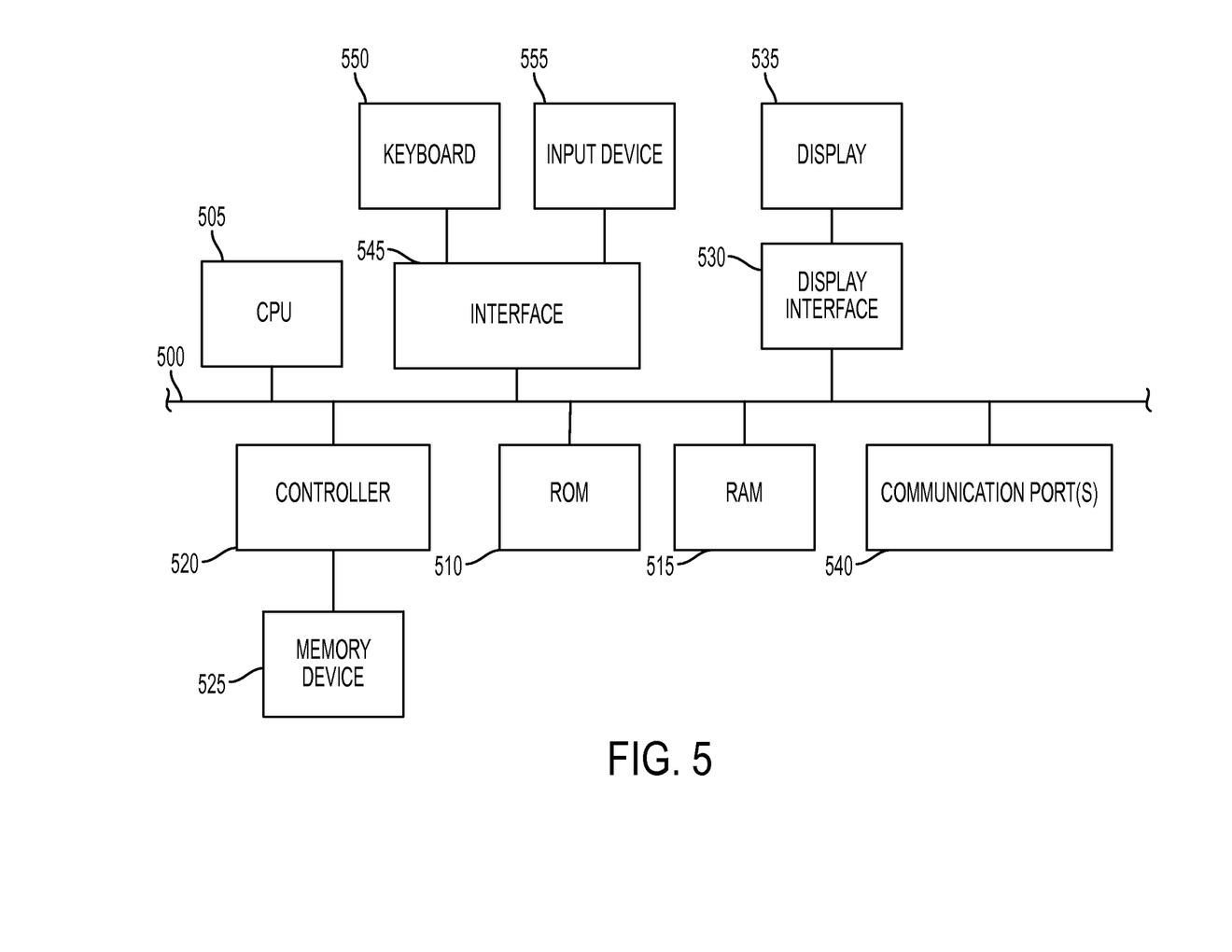
FIG. 5 is a block diagram showing elements of a computing system that may be used in accordance with various embodiments.

FIG. 5 depicts a block diagram of an example set of internal hardware that may be used to contain or implement program instructions, such as the process steps discussed above in reference to FIG. 4, according to embodiments. Any or all of the elements may be included in the consumer's electronic device and/or the clearinghouse server. A bus 500 serves as an information highway interconnecting the other illustrated components of the hardware. CPU 505 is an example of a processor that may serve central processing unit of the system, performing calculations and logic operations required to execute a program. CPU 505, alone or in conjunction with one or more other processors and/or other elements disclosed in FIG. 5, is an example of a processing device, computing device or processor as such terms are used within this disclosure. Read only memory (ROM) 510 and random access memory (RAM) 515 constitute examples of memory devices or processor-readable storage media.

A controller 520 interfaces with one or more optional tangible, computer-readable memory devices 525 to the system bus 500. These memory devices 525 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 510 and/or the RAM 515. Optionally, the program instructions may be stored on a tangible computer readable medium such as a compact disk, a digital disk, flash memory, a memory card, a USB drive, an optical disc storage medium, such as a Blu-Ray™ disc, and/or other recording medium.

An optional display interface 530 may permit information from the bus 500 to be displayed on the display 535 in audio, visual, graphic or alphanumeric format. Communication with external devices, such as a printing device, may occur using various communication ports 540. A communication port 540 may be attached to a communications network, such as the Internet or an intranet.

The hardware may also include an interface 545 which allows for receipt of data from input devices such as a keyboard 550 or other input device 555 such as a camera, scanner, mouse, a joystick, a touch screen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of matching users of a network, comprising:
   maintaining a database of profile data for a plurality of users of a network, wherein the profile data for each user comprises at least one attribute and at least one interest;
   receiving, from a first one of the users, a request for interaction with another user via the network, and identifying a target language goal for the first user;
   selecting a subset of the users as a candidate set so that the candidate set comprises users having:
      a native language that matches a language of the goal or are fluent in the language of the goal, and
      a capability of speaking a native language of the first user;
   by a processor, determining a point match score for each user in the candidate set, wherein the point match score comprises a measure of strength for a single interest that the candidate set user shares in common with the first user;
   by the processor, determining a compatibility match score for each user in the candidate set, wherein the compatibility match score comprises a collective measurement for a plurality of interests that the candidate set user shares in common with the first user;
   by the processor, using the point match scores and the compatibility match scores to select a user from the candidate set as a second user who is a candidate for interaction with the first user via the network; and
   presenting a profile of the second user to the first user.

2. The method of claim 1, further comprising
   presenting, to the first user with the profile, a description of one or more of the interests that the second user shares in common with the first user; and
   presenting, to the first user with the profile, a representation of the measure of strength for the single interest, a representation of the collective measurement, or both.

3. The method of claim 1 further comprising, before determining the point match score:
   measuring a plurality of representations of interests of the first user using a reciprocal-weighted preference accumulation; and
   expressing any measured interest that is below a threshold as zero.

4. The method of claim 1, further comprising:
   using the point match scores to select a plurality of additional users from the candidate set as additional candidates for interaction with the first user via the network, wherein each of the additional users corresponds to a point match score that exceeds a threshold; and
   presenting profiles for the plurality of additional users to the first user.

5. The method of claim 4, further comprising, when presenting profiles for each of the presented plurality of additional users:
   presenting a description of one or more of the interests that the additional user shares in common with the first user; and
   presenting a representation of the measure of strength for each presented interest, a representation of the collective measurements for the additional user, or both.

6. The method of claim 1, further comprising:
   using the compatibility match scores to select a plurality of additional users from the candidate set as additional candidates for interaction with the first user via the network, wherein each of the additional users corresponds to a compatibility match score that exceeds a threshold; and
   presenting profiles for the plurality of additional users to the first user.

7. The method of claim 1, wherein:
   receiving the request for interaction includes receiving a discussion topic; and
   selecting a user from the candidate set as the second user comprises identifying the user from the candidate set who corresponds to the highest point match score for an interest that corresponds to the discussion topic.

8. The method of claim 1, wherein selecting a user from the candidate set as the second user comprises:
   determining, for each user in the candidate set, a product of that user's point match score and compatibility match score; and
   selecting, as the second user, the user in the candidate set who corresponds to the highest determined product.

9. The method of claim 1, further comprising excluding from selection as the second user any user in the candidate set who corresponds to an exclusion criterion.

10. The method of claim 1, further comprising:
    receiving, from a first one of the users, a goal for interaction with another user via the network; and
    selecting the candidate set by accessing the profile data and including in the subset only those users having one or more attributes that are compatible with the goal.

11. The method of claim 1, further comprising:
    presenting a first video interface for the first user and a second video interface for the second user so that the first user and the second user may interact with each other via the first and second video interfaces.

12. The method of claim 1, further comprising:
receiving a language request from the first user; and
when selecting the candidate set, accessing the profile data and including in the candidate set only those users having language attributes that correspond to the language request.

13. The method of claim 1, further comprising requiring that the second user meet one or more availability criteria.

14. A network user matching system, comprising:
a user profile database containing profile data for a plurality of users of a network, wherein the profile data for each user comprises at least one attribute and at least one interest,
a processor, and
a computer-readable memory containing programming instructions that, when executed, are configured to instruct the processor to:
receive, from a first one of the users, a request for interaction with another user via the network, and identify a target language goal for the first user;
select a subset of the users as a candidate set so that the candidate set comprises users having:
a native language that matches a language of the goal or are fluent in the language of the goal, and
a capability of speaking a native language of the first user,
determine a point match score for each user in the candidate set, wherein the point match score comprises a measure of strength for a single interest that the candidate set user shares in common with the first user;
determine a compatibility match score for each user in the candidate set, wherein the compatibility match score comprises a collective measurement for a plurality of interests that the candidate set user shares in common with the first user;
use the point match scores and the compatibility match scores to select a user from the candidate set as a second user who is a candidate for interaction with the first user via the network; and
present a profile of the second user to the first user.

15. The system of claim 14, further comprising instructions to:
present, to the first user with the profile, a description of one or more of the interests that the second user shares in common with the first user; and
present, to the first user with the profile, a representation of the measure of strength for the single interest, a representation of the collective measurement, or both.

16. The system of claim 14, further comprising instructions to:
use the point match scores to select a plurality of additional users from the candidate set as additional candidates for interaction with the first user via the network, wherein each of the additional users corresponds to a point match score that exceeds a threshold; and
present profiles for the plurality of additional users to the first user, along with, for each additional user:
a description of one or more of the interests that the additional user shares in common with the first user; and
a representation of the measure of strength for each presented interest, a representation of the collective measurements for the additional user, or both.

17. The system of claim 14, wherein the instructions further comprise instructions to:
when selecting the second user, requiring that the second user meet one or more availability criteria, wherein the availability criteria include one or more of the following: whether the user is online now, whether the user is a current subscriber, or whether the user has remaining service credit available.

18. The system of claim 14, wherein the instructions further comprise instructions to:
measure a plurality of representations of interests of first user using a reciprocal-weighted preference accumulation; and
express any measured interest that is below a threshold as zero.

19. The system of claim 14, further comprising instructions to present a first video interface for the first user and a second video interface for the second user so that the first user and the second user may interact with each other via the first and second video interfaces.

20. A computer program product, comprising:
a non-transitory computer-readable memory containing programming instructions that, when executed, are configured to instruct a processor to:
access a user profile database containing profile data for a plurality of users of a network, wherein the profile data for each user comprises at least one attribute and at least one interest;
receive, from a first one of the users, a request for interaction with another user via the network, wherein the request comprises a goal;
select a subset of the users as a candidate set so that the subset of users in the candidate set comprises users having:
a native language that matches a language of the goal or are fluent in the language of the goal, and
a capability of speaking a native language of the first user;
determine:
a point match score for each user in the candidate set, wherein the point match score comprises a measure of strength for a single interest that the candidate set user shares in common with the first user, and
a compatibility match score for each user in the candidate set, wherein the compatibility match score comprises a collective measurement for a plurality of interests that the candidate set user shares in common with the first user;
use the point match scores and the compatibility match scores to select a user from the subset as a second user who is a candidate for interaction with the first user via the network;
present a profile of the second user to the first user; and
present a first user interface for the first user and a second user interface for the second user so that the first user and the second user may interact with each other via the first and second user interfaces.

21. The computer program product of claim 20, further comprising instructions to:
present, to the first user with the profile, a description of one or more of the interests that the second user shares in common with the first user; and
present, to the first user with the profile, a representation of the measure of strength for the single interest, a representation of the collective measurement, or both.

22. The computer program product of claim 20, further comprising instructions to:
- use the point match scores to select a plurality of additional users from the candidate set as additional candidates for interaction with the first user via the network, wherein each of the additional users corresponds to a point match score that exceeds a threshold; and
- present profiles for the plurality of additional users to the first user, along with, for each additional user:
  - a description of one or more of the interests that the additional user shares in common with the first user; and
  - a representation of the measure of strength for each presented interest, a representation of the collective measurements for the additional user, or both.

23. The computer program product of claim 20, wherein the instructions further comprise instructions to:
- when selecting the second user, require that the second user meet one or more availability criteria, wherein the availability criteria include one or more of the following: whether the user is online now, whether the user is a current subscriber, or whether the user has remaining service credit available.

* * * * *